US008797286B2

(12) United States Patent
Hand

(10) Patent No.: US 8,797,286 B2
(45) Date of Patent: Aug. 5, 2014

(54) USER INTERFACE AND METHOD FOR MANAGING A USER INTERFACE STATE BETWEEN A LOCKED STATE AND AN UNLOCKED STATE

(75) Inventor: Anthony D. Hand, San Jose, CA (US)

(73) Assignee: Motorola Mobility LLC, Libertyville, IL (US)

( * ) Notice: Subject to any disclaimer, the term of this patent is extended or adjusted under 35 U.S.C. 154(b) by 124 days.

(21) Appl. No.: 13/208,738

(22) Filed: Aug. 12, 2011

(65) Prior Publication Data

US 2013/0027319 A1   Jan. 31, 2013

Related U.S. Application Data

(60) Provisional application No. 61/513,030, filed on Jul. 29, 2011.

(51) Int. Cl.
G06F 3/041 (2006.01)
G06F 3/033 (2013.01)

(52) U.S. Cl.
USPC .......................................... 345/173; 715/863

(58) Field of Classification Search
USPC .......................................... 345/173; 715/863
See application file for complete search history.

(56) References Cited

U.S. PATENT DOCUMENTS

| 6,368,176 | B1 | 4/2002 | Lozowski et al. |
| 7,657,849 | B2* | 2/2010 | Chaudhri et al. ............. 715/863 |
| 2007/0026944 | A1* | 2/2007 | Maehiro et al. ................. 463/31 |
| 2007/0150842 | A1 | 6/2007 | Chaudhri et al. |
| 2009/0006991 | A1 | 1/2009 | Lindberg et al. |
| 2009/0239573 | A1 | 9/2009 | Kretz et al. |
| 2009/0284482 | A1* | 11/2009 | Chin ............................. 345/173 |
| 2010/0070926 | A1 | 3/2010 | Abanami et al. |
| 2011/0187727 | A1 | 8/2011 | Ahn et al. |
| 2012/0223890 | A1* | 9/2012 | Borovsky et al. ............. 345/173 |

FOREIGN PATENT DOCUMENTS

WO   2009074185 A1   6/2009

OTHER PUBLICATIONS

Akella, "User Interface and Method for Managing a User Interface State Between a Lock State and an Unlock State" U.S. Appl. No. 13/190,842, filed Jul. 26, 2011.
Hand, "User Interface and Method for Managing a User Interface State Between a Locked State and an Unlocked State", U.S. Appl. No. 13/208,682, filed Aug. 12, 2011.

(Continued)

*Primary Examiner* — Kevin M Nguyen
(74) *Attorney, Agent, or Firm* — Shumaker & Sieffert, P.A.

(57) ABSTRACT

A user interface of a touch sensitive display for an electronic device and method for managing a state of a user interface of a touch sensitive display between a locked state and an unlocked state are provided. The touch sensitive display is adapted for receiving a user interaction with the touch sensitive display at a location along the display surface including a display element selection and a defined path. The state of the user interface is changed from the locked state to the unlocked state when a state change module detects display elements in respective unlock positions, where a lock state interface module including a path analyzer having an avoid area comparator determines whether a gesture attempting to transition a display element from a lock position to its respective unlock position interacts with an avoid area, and if so returning the display element to its preselection position.

18 Claims, 5 Drawing Sheets

(56) References Cited

OTHER PUBLICATIONS

AppBrain website, Puzzles Lock free, http://www.appbrain.com/app/%5Bdf%5Dpuzzles-lock-free/com.nanoha.puzzleslock, downloaded from internet Apr. 3, 2012.

How to: Use Multi-Touch Gestures with an Android Unlock for iPhone, iPad, and iPod Touch (iLock), Apr. 10, 2011, http://www.youtube.com/watch?v=_XuVgNIXBvg, one page, refer video from 3:10 to 4:10.

Apple granted patent on slide to unlock, even though it existed 2 years before they invented it, Oct. 25, 2011, http://www.youtube.com/watch?v=_XuVgNIXBvg, one page, refer video from 4:00 to 4:35.

HTC Sense 3.0 lockscreen, Jun. 16, 2011, http://www.youtube.com/watch?feature=player_embedded&v=L4-q4-GeTBM#!, one page, refer video from 0.30 to 0.45.

\* cited by examiner

USER INTERFACE AND METHOD FOR MANAGING A USER INTERFACE STATE BETWEEN A LOCKED STATE AND AN UNLOCKED STATE

CROSS-REFERENCE TO RELATED APPLICATIONS

The present application claims benefits under 35 U.S.C. 119(e) to U.S. Provisional Application No. 61/513,030 filed on 29 Jul. 2011, the contents of which are incorporated herein by reference.

FIELD OF THE DISCLOSURE

The present disclosure relates generally to managing a user interface state between a locked state and an unlocked state and, more particularly, to the movement of a display element between an area of display surface corresponding to a lock position and an area of the display surface corresponding to an unlock position, where during the transition from the lock position to the unlock position a traced path directing a path of movement does not coincide with an avoid area.

BACKGROUND

The use of touch sensitive interfaces, including those incorporated as part of a touch sensitive display have gained in popularity for their ease of use associated with a more intuitive interaction in accessing and controlling the functionality of an electronic device including interacting with displayed elements and/or information. Furthermore, touch sensitive displays have greatly expanded the types of user interactions which can be regarded as a valid form of input. Many interfaces have made use of these expanded opportunities to extend the types of interactions that can be defined for interacting with the device and more particularly the various applications running on the device. These interactions have been expanded to include what has sometimes been referred to as gestures. In some cases, a gesture can be as concise as a brush across the touch sensitive surface. In other instances, a gesture can trace complicated patterns and include multiple points of interaction with the surface. In at least some instances, the location at which the gesture begins can be used to select a particular one of the elements being displayed with which the user wishes to interact, and the subsequent traced movement along the surface of the display defines the nature of the interaction with the displayed element selected by the user. Still further, many interfaces have been designed to allow corresponding functionality to be performed in simple and succinct ways with a trend toward involving a minimal number of steps and/or interactions which, in essence, involves a streamlining of the interactions necessary for producing a desired effect.

Correspondingly, by increasing the types of interactions that will be viewed as a valid form of input and minimizing the number of steps to produce and/or trigger a corresponding function, there is an increased chance that an unintended interaction will coincide with an interaction from the expanded list of permissible types of gestures or interactions with the possibility that it will trigger an unintended consequence. In essence, any stray movement of a body part of the user relative to the touch sensitive surface of the display has the potential to select an item being displayed with which the user can interact, and correspondingly the nature of the movement has the potential that it will be recognized as a gesture associated with a valid function that will be acted upon, and/or may trigger an action relative to the selected item. In some cases, the stray movement which is not intended to be a purposeful interaction may be repeated in a regular fashion, which can compound or magnify the resulting interaction. For example, a user's hip or leg might brush against the display surface of the device with each step as a user walks while carrying the device. Correspondingly, each stray movement, or the repeated movements when considered together, has the potential to be treated as a valid interaction despite its unintended origins.

As such, with expanded types of interactions and a set of streamlined interactions for producing an effect, it has become increasingly likely that a user can unknowingly activate functionality on the device, such as initiate a telephone call or manipulate a stored element, such as a file, including accidentally moving, copying or erasing the same through a stray interaction. In response to this, user interface developers have implemented lock screens, which temporarily disable at least a portion of the user interface, and generally require an unlock interaction before other types of interactions will be recognized. In some cases, the lock screen will be engaged after a fixed period of inactivity during which the user has not interacted with the device. In other instances, a lock screen state can be purposely initiated by the user.

However for the same reasons that users desire more streamlined user interactions for producing desired and intended functionality, any interaction associated with the unlocking of a locked user interface should similarly avoid being overly burdensome or complex, in order to avoid the user finding the use of the feature frustrating, and correspondingly disabling the feature. Hence the challenge is to develop and provide a straight forward and intuitive interaction for unlocking a locked device which is not overly burdensome, but which also can not readily be accidently initiated.

Correspondingly, the present inventor has recognized that it would be beneficial to develop an apparatus and/or approach for transitioning between a user interface locked state and a user interface unlocked state, which is intuitive and not unduly burdensome to the user, while simultaneously reducing the risk that a stray or unintended interaction could accidently transition the device to an unlocked state without the transition to the unlocked state being the express intent of the user of the device.

SUMMARY

The present disclosure provides among other features a user interface for an electronic device or other machine. The user interface has a touch sensitive display having a display surface, the touch sensitive display being adapted for presenting to a user at a respective position at least one display element along the display surface. The touch sensitive display is further adapted for receiving from the user, a user interaction with the touch sensitive display at a location along the display surface. The user interface further includes a controller. The controller includes a user interface state module having an unlocked state and a locked state adapted for selectively enabling and disabling at least a portion of the user interface, wherein the portion of the user interface responds to a predetermined type of user interaction when in the unlocked state and does not respond to the predetermined type of user interaction when in the locked state. The controller further includes a state change module adapted for switching the state of the user interface state module between the locked state and the unlocked state. The state change module switches the state of the user interface module from the locked state to the unlocked state when the state change module detects each of the at least one display elements in respective unlock position for the corresponding one of the at least one display elements. The state change module includes an unlock area detector, where the respective unlock position of the corresponding one of the at least one display element includes placement within a respective predetermined area, and wherein when the state change module switches the state of the user interface state module to a locked state, the state change module is adapted to respectively reposition each of the at least one display element to an area of the display surface other than the respective predetermined area of the respective unlock position. The controller still further includes a lock state interface module. The lock state interface module is adapted to detect a received user interaction including the selection by the user of one of the at least one display elements. The lock state interface module is further adapted to detect a further received user interaction including a post-selection gesture, which moves the selected one of the at least one display element from a preselection position to a post-gesture position having a placement in a new area. The post-selection gesture includes a path which is traced proximate the display surface of the touch sensitive display by the user using a pointer having a position that moves along the path. The lock state interface module includes a path analyzer unit having an avoid area detector. If a current position of the pointer along the traced path coincides with an avoid area of the display surface, the display element is returned by the lock state interface module to the preselection position of the display element.

In at least one embodiment, the avoid area changes as a function of time. In some of these instances, the avoid area has a size where the size of the avoid area changes as a function of time, and/or the avoid area has a location where the location of the avoid area changes as a function of time.

The present disclosure further provides a method for managing a state of a user interface between a locked state and an unlocked state. The method includes switching a state of the user interface from the unlocked state to the locked state. At least one display element is then presented to the user via a display surface of a touch sensitive display at a respective position. When the state of the user interface is switched from the unlocked state to the locked state, the at least one display element is positioned in an area of the display surface other than a predetermined area of a respective unlock position. A user interaction is then detected proximate the display surface via the touch sensitive display. The user interaction includes a selection by the user of one of the at least one display element and a postselection gesture, which directs the movement of the display element from a preselection position to a postgesture position having a placement in a new area, where the postselection gesture includes a path which is traced proximate the display surface of the touch sensitive display by the user using a pointer having a position that moves along the path. If a current position of the pointer along the traced path coincides with an avoid area of the display surface, the display element is returned to the preselection position of the display element. If the current position of the pointer along the traced path does not coincide with the avoid area of the display surface, the display element is relocated at the postgesture position. When each of the at least one display element is detected in the respective unlock position of the corresponding at least one display element, the state of the user interface is then switched from the locked state to the unlocked state.

These and other objects, features, and advantages of this disclosure are evident from the following description of one or more preferred embodiments of this invention, with reference to the accompanying drawings.

DETAILED DESCRIPTION

Figure 1:
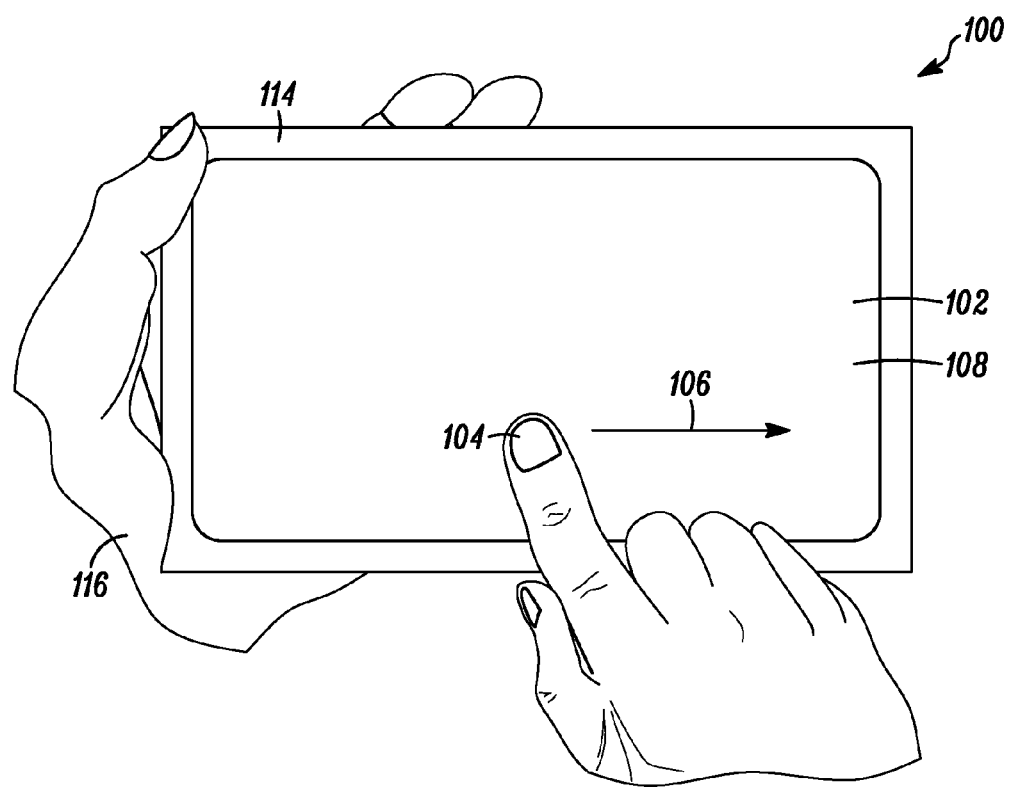
FIG. 1 is a plan view of an exemplary electronic device incorporating a touch sensitive interface, such as a touch sensitive display, for receiving a user interaction relative to one or more interactive elements.

While the present disclosure is susceptible of embodiments in various forms, there is shown in the drawings and will hereinafter be described presently preferred embodiments with the understanding that the present disclosure is to be considered an exemplification of the invention and is not intended to limit the invention to the specific embodiments illustrated. Furthermore, while the various figures are intended to illustrate the various aspects of the present invention, in doing so, the elements are not necessarily intended to be drawn to scale. In other words, the size, shape and dimensions of some layers, features, components and/or regions for purposes of clarity or for purposes of better describing or illustrating the concepts intended to be conveyed may be exaggerated and/or emphasized relative to other illustrated elements.

FIG. 1 illustrates a plan view of an exemplary electronic device 100 incorporating a touch sensitive interface 102. In the particular embodiment illustrated, the touch sensitive interface 102 is incorporated as part of a touch sensitive display 108, where a surface coincides with and extends to include a display, which provides information visually to the user. The surface is adapted to receive an input from a pointer, such as a user's finger 104 or other appendage, or a stylus (not shown), where the nature of the interaction of the pointer with the sensor surface defines a pattern of interaction and any related gesture 106 or movement. For example, the pattern of interaction may include touching or contacting a point on the touch sensitive interface with the pointer, or navigation or other movement of the pointer along or across the touch sensitive interface while contacting the interface or being within a predefined proximity of the interface, among other interactions between the pointer and the touch sensitive interface. The electronic device could be one of many different types of electronic devices including wireless communication devices, such as radio frequency (i.e., cellular) telephones, media (i.e., music, video) players, personal digital assistants, portable video gaming devices, cameras, and/or remote controls. The electronic device may also be a user input subassembly of some other equipment, like an appliance or other machine.

The touch sensitive user interface 102 often includes a touch sensitive array, which has position sensors that are adapted for detecting a position and/or proximity of a corresponding pointer device relative to the touch sensitive user interface 102. Many existing forms of touch sensitive arrays include arrays which are resistive or capacitive in nature. Still further, the touch sensitive array can even employ a force sensing element array for detecting an amount of force being applied at the selected location. In this way, a force threshold determination can be taken into account in determining an intended interaction including the selection of an interactive element, such as a display element, or the making of a gesture. However, the use of other forms of touch sensitive arrays are possible without departing from the teachings of the present disclosure.

While the pointer device can include a user's finger 104, a stylus, or any other suitable often times generally elongated element for identifying a particular area associated with the touch sensitive array, in some instances, the determination of an appropriate pointer may be affected by the particular technology used for the touch sensitive array, where in some instances a particular type of pointer may work better in conjunction with a particular type of array. In FIG. 1, the device 100 is illustrated as being held by a hand 116 on at least one of the (i.e. the left) sides 114 with the other hand, and more particularly a finger 104 of the other hand, being used to interact with the surface of the display of the touch sensitive user interface. Through the use of a finger 104 or a stylus, a user can produce a gesture 106 that can be detected by the device 100 through an interaction with the touch sensitive interface 102.

Figure 2:
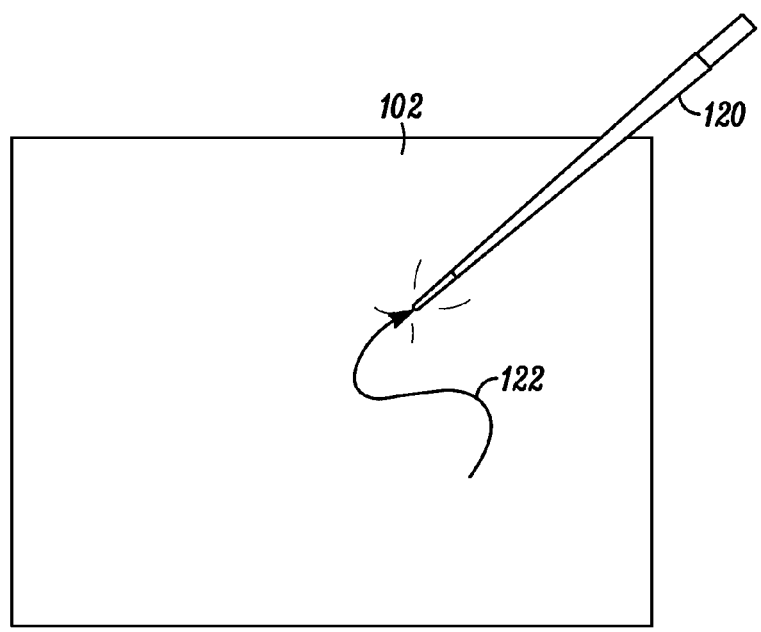
FIG. 2 is a plan view of a pointer device engaging a touch sensitive surface and tracing a potential exemplary single pointer pattern movement that might be effective as a gesture.

FIG. 2 illustrates an example of a pointer device 120 engaging a touch sensitive surface 102 and tracing a potential exemplary single pointer pattern movement 122 that might be effective as a gesture for adjusting the performance of an active controllable interface function. While generally a pointer is used to interact with the touch sensitive user interface, in reality the proximity of any item relative to the touch sensitive surface can sometime be detectable as an interaction, whether intended or not. For example, if the device is brought within proximity of a user's face, in instances where the device supports telephone calls, the user's cheek brushing up against the device has the potential of being detected as a user interaction. As such, devices have used lock screens to help reduce the circumstances in which anticipated or unanticipated unintended interactions are erroneously detected as a device input. However, because a user needs to be able to navigate away from the locked state in order to interact with the device, but at the same time you do not want the device to be accidently unlocked by the same unintended interactions that the lock screen was intended to filter, the lock screen and the particular action on the part of the user necessary for unlocking the device, become a balance between effectively filtering unintended interactions, and not requiring an overly complex interaction for enabling the user to transition the device back to an unlocked state.

Figure 3:
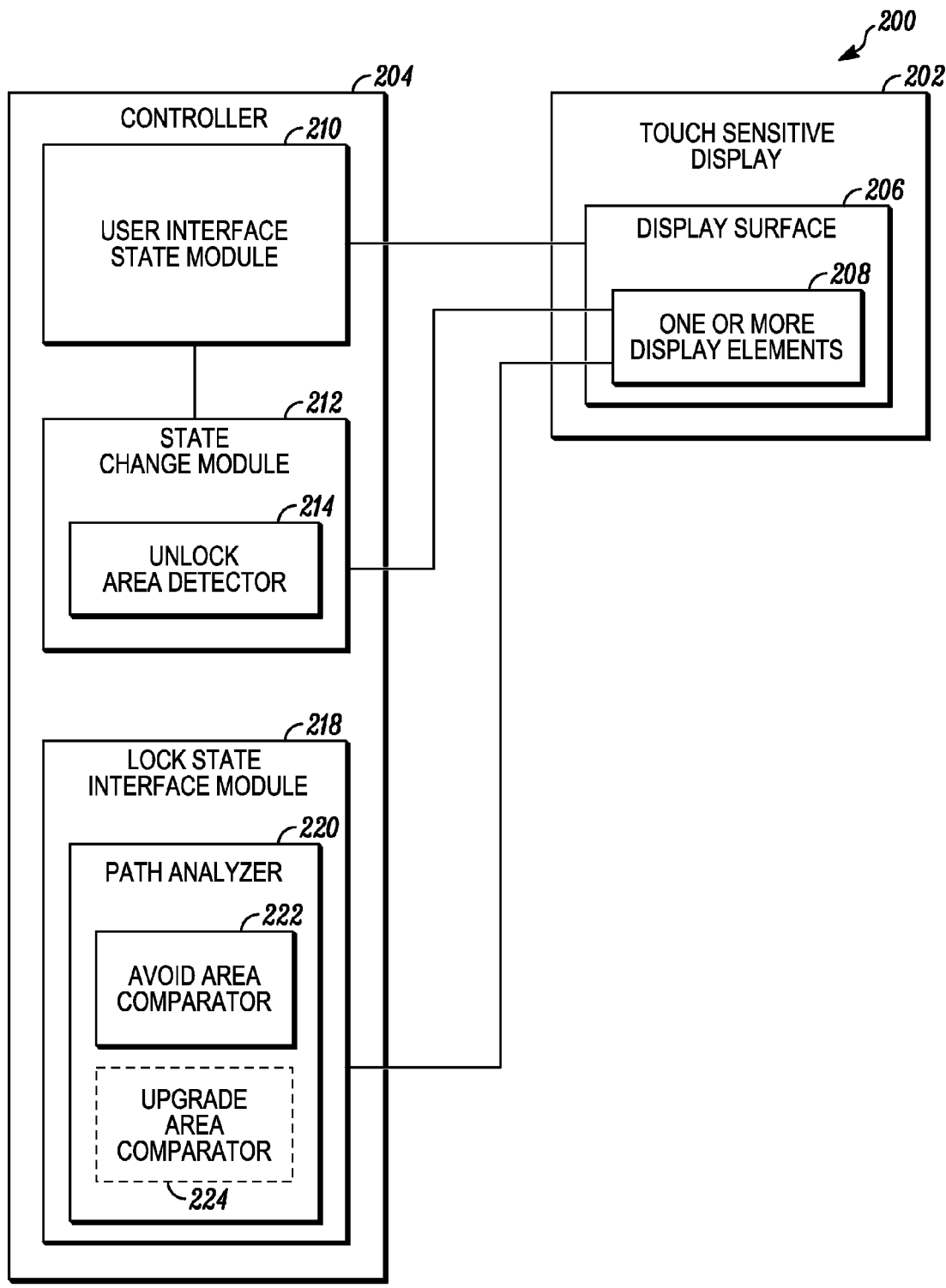
FIG. 3 is a block diagram of a user interface incorporated as part of an electronic device.

FIG. 3 illustrates a block diagram 200 of a user interface incorporated as part of an electronic device. The user interface includes a touch sensitive display 202 and a controller 204. The touch sensitive interface 202 includes a display surface 206 including one or more display elements 208 for presentation to the user via the display surface with which the user can interact. The display surface 206 of the touch sensitive display is adapted for receiving a gesture or pattern of interaction from a user either directly, for example 106 in FIG. 1, or indirectly via a pointing device, for example 122 in FIG. 2. The detected gesture or pattern of interaction can then be interpreted in order to discern a desired action on the part of the user.

However as noted previously not all interactions detected via the touch sensitive display may be the result of a desired action on the part of the user. In some instances an unintended interaction with the device may be made and detected proximate the touch sensitive surface of the device. As such, in some circumstances, it may be desirable to have the touch sensitive surface be in a locked state, which limits the nature and type of interactions that will be detected as a valid user input. Generally, while in a locked state the user interface will be focused on those particular actions which are intended on contributing to the transition of the user interface back to an unlocked state. The state of the user interface between a locked state and an unlocked state is managed by the controller 204. In support of this function, the controller 204 includes a user interface state module 210, which selectively enables and disables at least a portion of the user interface, including the types of interactions to which the interface will respond.

The controller further includes a state change module 212, which is adapted for switching the state of the user interface that is managed by the user interface state module 210, between a locked state and an unlocked state. The state change module switches the state of the user interface module from the locked state to the unlocked state when the state change module detects that each of the at least one display element is in its respective unlock position, which generally includes placement within a respective predetermined area. In order to determine when the display elements are each in their respective predetermined areas of their unlock positions, the state change module includes an unlock area detector 214.

The controller 204 further includes a lock state interface module 218 which manages the functioning of at least a portion of the device while the user interface is in a locked state. As part of that management, the lock state interface module 218 monitors interactions with the touch sensitive surface of the display, and detects interactions with elements being displayed while the user interface state module 210 is in a locked state. The lock state interface module 218 further manages the elements 208 being displayed including their subsequent selection and movement including those intentionally or unintentionally prompted by the user, while the device is in a locked state.

When in a locked state, the user interface presents to the user at least one display element having a current respective position. In at least some instances, the act of unlocking may require a selection of a display element, and corresponding movement of the display element from a lock position to an unlock position. In these instances, in order to interact with the display element, the user needs to initiate a selection of the display element. Generally, the lock state interface module 218 will detect a user gesture including an attempted selection of a display element proximate the beginning point of a detected gesture, and a subsequent path that is traced by the pointer device until the tip of the pointer device is disengaged from its position proximate the surface 206 of the display. The subsequent path is sometimes referred to as a postselection portion of a gesture, and will sometimes define an action that can be used to affect the current position of the particular display element, if any, that has been selected. For example in some instances, the postselection portion of the gesture can define a displacement and corresponding path of the selected display element, where an updated position of the display element will generally correspond to the end point of the postselection portion of the gesture.

While a user can visually detect a display element's current position, unintended interactions are generally blind. Correspondingly, an unintended interaction will only select a particular display element in instances where the unintended interaction coincides with the current location of the display element, when the unintended interaction with the display surface is first detected.

Still further, an analysis of the path defined by the postselection portion of the gesture can be used to detect an unintentional interaction, where in these instances the particular area through which the display element is said to travel can include areas, which are to be avoided. As noted previously, because unintentional interactions are generally blind, they generally cannot purposely avoid a particular area, at least not in the same manner in which a person that is consciously controlling the movement of a display element can detect and avoid a particular area. As such, the lock state interface module 218 includes a path analyzer 220, which includes an avoid area analyzer 222.

In addition to an avoid area comparator 222, in some instances, the path analyzer can additionally include an upgrade area comparator 224. While the avoid area can be an area that interrupts the transition of a display element between a lock position and an unlock position through the use of a gesture, the upgrade area has the potential to fortify the display element so that it can infringe upon the avoid area at least partially without triggering the adverse effect on the current gesture, where the gesture may be interrupted if the current position along the path of the postselection gesture coincides with the current area occupied by the avoid area. The acquired resistance against the avoid area from the upgrade area in at least some instances may be effective for a finite period of time, which may be measured in some instances from the time that the upgrade is acquired. In other instances it may be effective for a finite period of time, which may be measured from the time of any interaction with the avoid area. Similar to the avoid area, The effects of the upgrade area can be triggered when the current position along the path of the postselection gesture coincides with the current area occupied by the upgrade area and is detected by the upgrade area comparator 224. The upgrade area provides a potential path for the display element that would serve to diminish the effects of subsequent interactions with the avoid area in instances where the path of the postselection gesture has been extended to travel through the upgrade area, which might serve to make avoiding the avoid areas a little easier once the upgrade effects are triggered.

Figure 4:
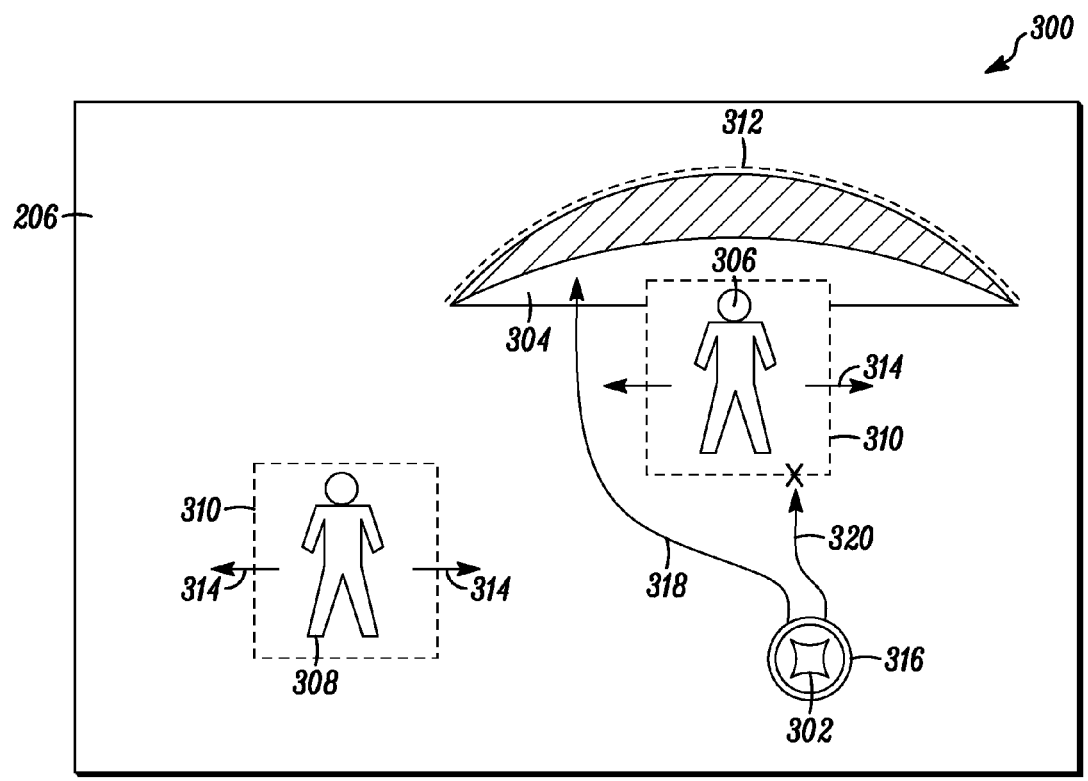
FIG. 4 is a plan view of a touch sensitive display illustrating a user interface while in a locked state and a potential user gesture for interacting with a display element.

FIG. 4 illustrates a plan view 300 of a touch sensitive display showing a user interface while in a locked state and a potential user gesture for interacting with a display element. The particular example illustrated includes a sports theme, and more specifically a soccer metaphor. In the illustrated example a soccer ball represents a display element 302, which can be moved to different points along the display surface 206 through one or more detected gestures. A goal area 304 represents an unlock area for the display element. Avoid areas 306 and 308 are represented by defenders including a goalie 306 and a fullback or midfielder 308. More specifically, in the illustrated example, the corresponding avoid area is highlighted by a dashed line 310 defining a boxed area around the defenders. While a rectangular boxed area is shown, one skilled in the art will recognized that other shapes and sizes are possible without departing from the teachings of the present disclosure. For example, the avoid area could include a defined line 312 that prevents the gesture from transitioning across a particular boundary. A dashed line 312 extending along the back of the net represents such an avoid area boundary which can affect the movement of the display element via a corresponding gesture, which intersects the avoid area boundary despite not having an area in the traditional sense. In the illustrated example, such a boundary can be used to prevent a display element, such as a soccer ball 302, from entering the unlock area, such as a goal area 304 through the back of the net.

In at least some instances, the avoid areas 306 and 308 can be used to restrict the types of valid paths that can be used to transition the display element 302 from its original lock position to an unlock position 304. For example, in some instances if the display element intersects with an avoid area 306 or 308, the user interface might interrupt the gesture currently transitioning the display element 302 to a new location, and in some instances may return the display element 302 to its preselection position. In other instances, the display element may be positioned in another random spot outside of the unlock area 304. In some instances, the random spot will be at least a predetermined distance away from the unlock area. While, intuitively, the same transition needs to occur to effect an unlocking of the user interface, by requiring that the manner in which the transition takes place results in a display element having a particular location and avoids certain paths, the number of potentially unintentional interactions that will produce a result that unlocks the device is minimized without significantly increasing the burden on the user from a conceptual and implementation viewpoint when the necessary goal to unlock the device is being purposely pursued.

In at least some instances, when the device transitions from an unlocked state to a locked state, the position of the at least one display element is randomly repositioned away from the unlock position, such that it deviates from the expected unlock position a random amount in a random direction. The device can also randomly place avoid areas in the space between the starting position for the display element and the corresponding unlock area. In at least some instances, an avoid area can be placed in the way of the most direct path to the corresponding unlock position. Such a placement will force at least some deviation from the most direct path, as part of the gesture that is intended to transition the display element to its respective unlock position. Where the display element is randomly repositioned and one or more avoid areas are randomly introduced, the particular motion that will produce a display element being properly situated in the unlock position has the potential to be different each time. However it is not necessary for the required position and the path for unlocking the device to be different every time. In other words, the same or similar lock and unlock positions could be used without change without departing from the beneficial teachings of the present application. Furthermore, the particular lock position and unlock position including the respective locations of avoid areas could in some instances be defined by the user.

In the illustrated example, the display element (i.e. soccer ball 302) can be transitioned to the corresponding unlock area (i.e. goal area 304) of the display element through the use of some gestures, namely a gesture that has a preselection portion that initiates in an area 316 corresponding to the initial position of the display element 302, and a gesture that has a postselection portion that includes a defined path 318 that intersects the unlock area 304 while avoiding the traversal of an avoid area 306 and 308. In instances where a postselection portion of a gesture includes a path 320 that intersects an avoid area 306, any further movement past the avoid area 306 can be interrupted.

In some instances, the unlock area can change as a function of time. For example, the unlock area can be moved laterally. In the illustrated embodiment, the defenders are allowed to move back and forth to the left and to the right as a function of time. This potential movement is highlighted by arrows 314 shown in FIG. 4. In other instance, the size and shape of the avoid area may change as a function of time.

Figure 5:
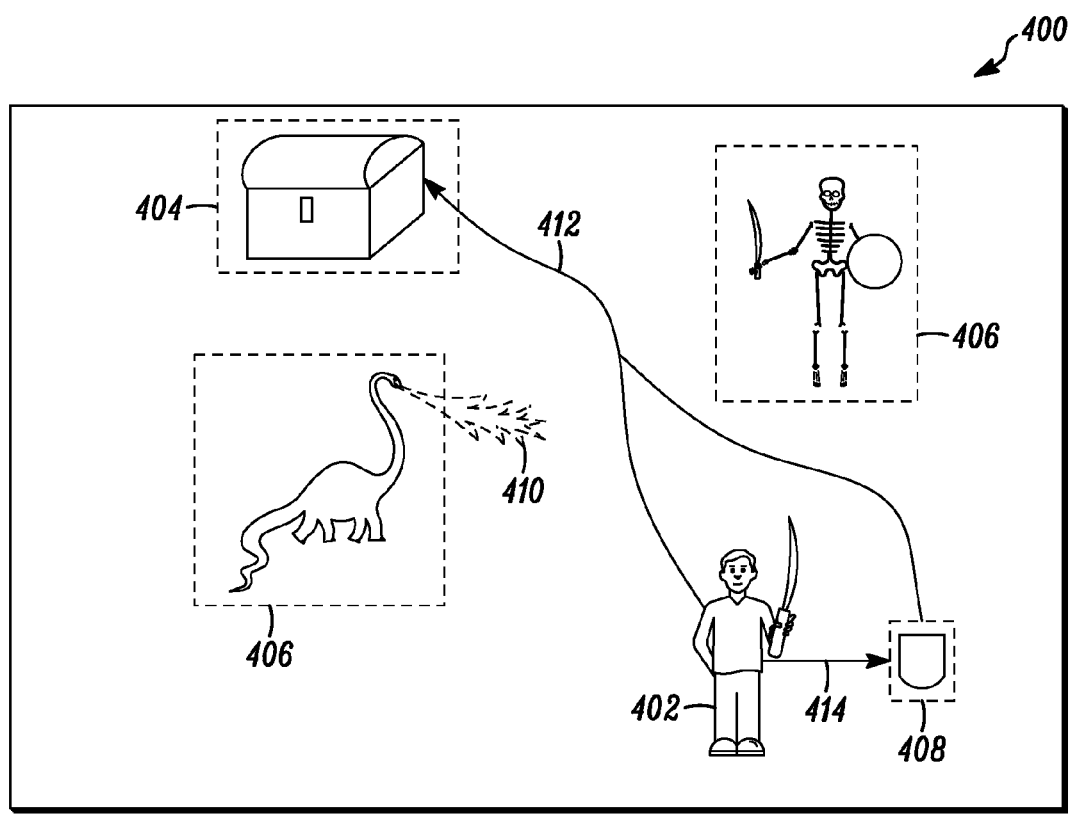
FIG. 5 is a further plan view of a touch sensitive display illustrating a user interface while in a locked state and a potential user gesture for interacting with a display element.

FIG. 5 illustrates a further plan view 400 of a touch sensitive display illustrating a user interface while in a locked state and a potential user gesture for interacting with a display element. The particular example illustrated includes a medieval knight theme. In the particular embodiment illustrated, a display element 402 is represented by a knight, and the corresponding unlock position 404 is represented by a treasure chest. Avoid areas 406 include a dragon and a skeleton, and an upgrade area 408 includes a shield. As noted previously, the avoid area can change as a function of time. For example, the dragon might periodically breathe fire 410 which can serve to alter the size and shape of one of the avoid areas 406, as a function of time. A gesture which selects the knight and defines a postselection path 412 that places the knight at the treasure while not intersecting any of the hazards can be effective in placing the corresponding display element (i.e. knight) in its respective unlock position, thereby allowing the device to transition away from a locked state to an unlocked state.

In some instances, the user has the option to transition 414 the display element 402 on its way to an unlock position 404 through an upgrade area 408, such as the shield area. In some instances, this can serve to provide an upgrade to the display element, which might help resist at least a portion of the hazard represented by the avoid areas. In some instances, possession of the upgraded effect will serve to shrink the effective size of the avoid area, where such a shrinking serves to simulate a degree of resistance to the hazard. In other instances, the upgrade may allow a particular portion of the display element to intersect the avoid area without triggering the effect associated with the avoid area.

Figure 6:
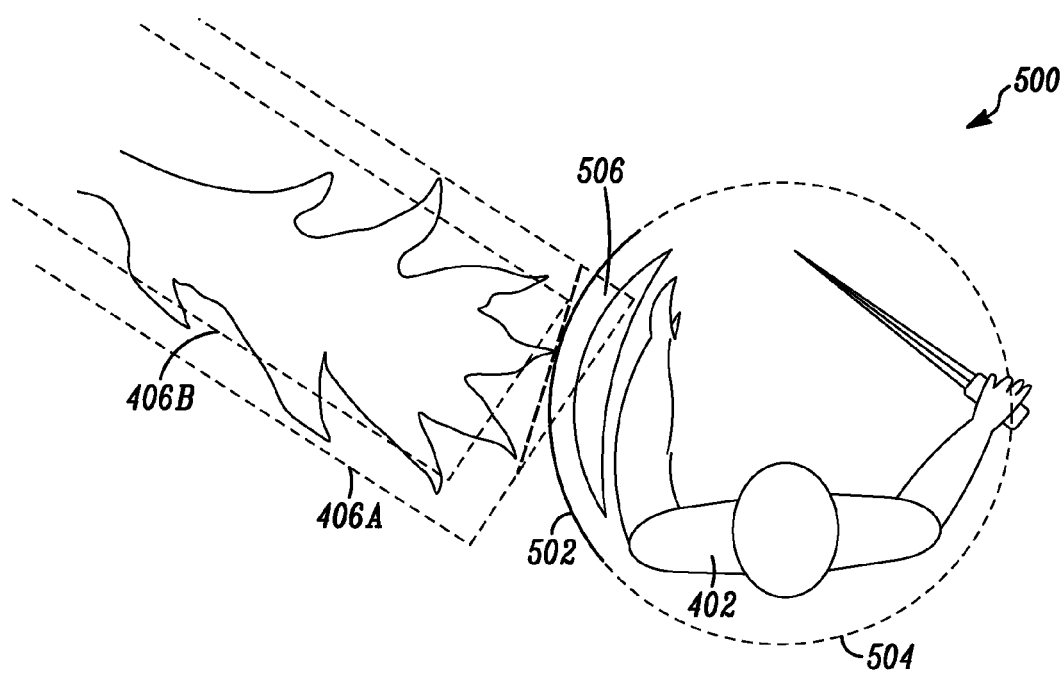
FIG. 6 is a partial plan view illustrating a potential interaction of a display element with an avoid area.

FIG. 6 illustrates a partial plan view 500 of a potential interaction of a display element with an avoid area after the display element has interacted with an upgrade area. As noted previously, in some instances, possession of a corresponding upgrade can affect the effective size and shape of the avoid area. For example, whereas the avoid area would generally extend to an area defined by dashed line 406a, if the display element is in possession of an upgrade the new avoid area may be defined by dashed line 406b. In some instances, the upgrade might provide a degree of protection to a portion of the circumference surrounding the display element, which would be allowed to interact with the avoid area. For example, the acquired shield might provide protection for a corresponding portion represented by a solid line 502 of an outer boundary represented by a circle 504 that extends around the display element 402. The portion 502 of the outer boundary 504, corresponding to the upgraded portion may be allowed to intersect a portion 506 of the avoid area 406a without triggering the hazard. In this way, a path 412 that includes the upgrade area 408 can be used to reduce the effective avoid area 406, thereby making it easier for the user to transition the display element 402 to its respective unlock position 404, but only after interacting with the upgrade area 408.

While a sports soccer theme and a medieval knight theme have been disclosed as exemplary embodiments, one skilled in the art will recognize that other themes are possible without departing from the teachings of the present disclosure. Furthermore, in the case of the sports metaphor, the theme can be extended to incorporate features of a particular team including a particular team's colors or logo. The sport theme can be extended further to include a particular player of the selected team including a particular player's looks, mannerisms or style.

In at least some embodiments, the controller 204, illustrated in FIG. 3, could be implemented in the form of a microprocessor, which is adapted to execute one or more sets of prestored instructions, which may be used to form at least part of one or more controller modules 210, 212. The one or more sets of prestored instructions may be stored in a storage element, not shown, which may be integrated as part of the controller or may be coupled to the controller.

A storage element could include one or more forms of volatile and/or non-volatile memory, including conventional ROM, EPROM, RAM, or EEPROM. The storage element may still further incorporate one or more forms of auxiliary storage, which is either fixed or removable, such as a hard-drive or a floppydrive. One skilled in the art will still further appreciate, that still other further forms of memory could be used without departing from the teachings of the present disclosure. In the same or other instances, the controller 204 may additionally or alternatively incorporate state machines and/or logic circuitry, which can be used to implement at least partially, some of modules and their corresponding functionality.

Figure 7:
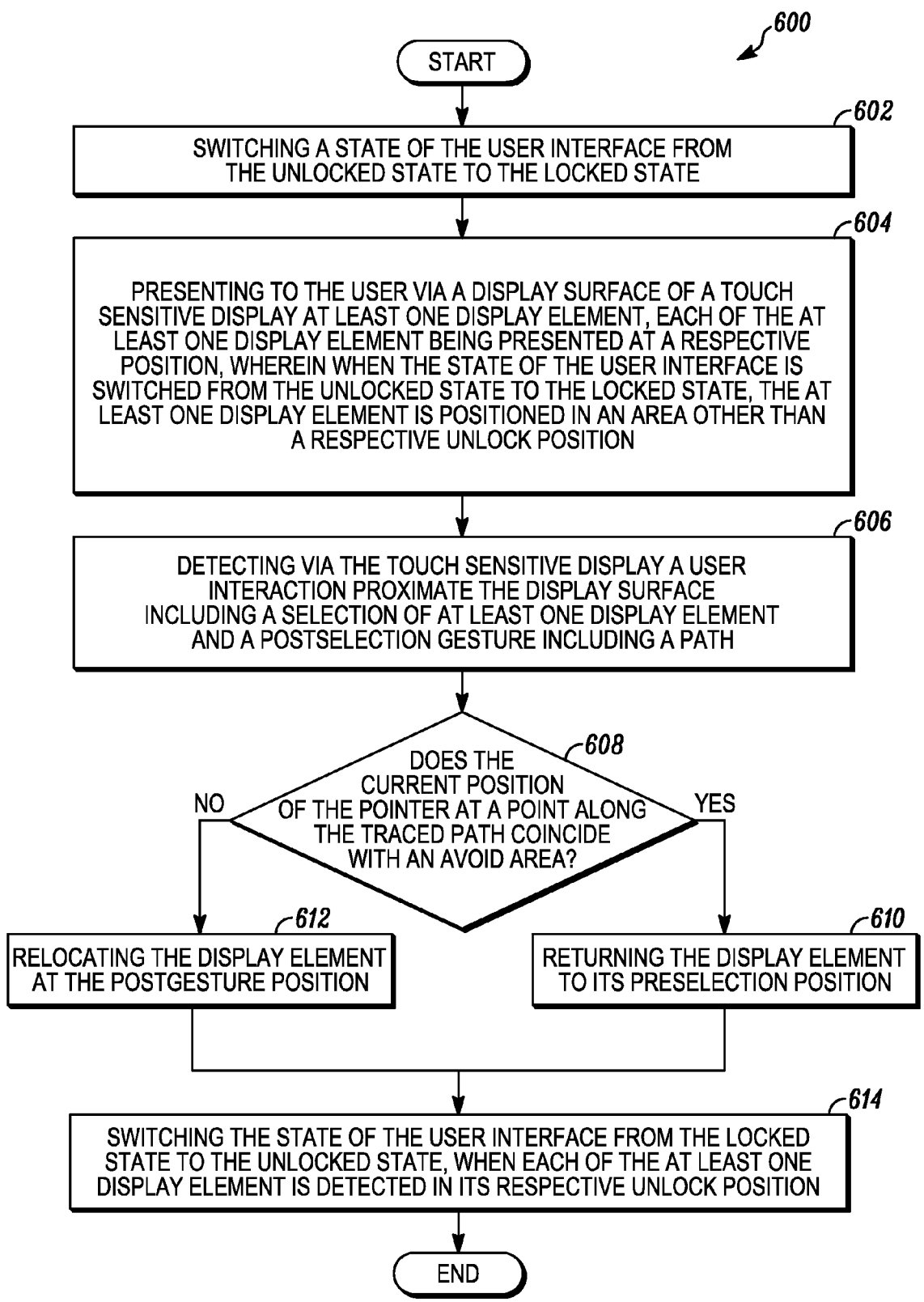
FIG. 7 is a flow diagram of a method for managing a state of a user interface between a locked state and an unlocked state.

FIG. 7 illustrates a flow diagram of a method 600 for managing a state of a user interface between a locked state and an unlocked state. The method includes, at 602, switching a state of the user interface from the unlocked state to the locked state. At 604, at least one display element is presented to the user via the touch sensitive display at a respective position. When the state of the user interface is switched to a locked state, the at least one display element is positioned in an area other than the respective unlock position. At 606, a user interaction is then detected via the touch sensitive display, which includes a selection of a display element and a postselection gesture using a pointer including a path which is intended to affect the movement of the display element. A determination 608 is then made as to whether the current position of a pointer at a point along the traced path coincides with an avoid area.

If the current position of the pointer along the traced path coincides with an avoid area, then the display element is returned 610 to its preselection position. If the current position of the pointer along the traced path does not coincide with an avoid area, then the display element is allowed to be relocated 612 in accordance with the defined path. The state of the user interface is switched 614 to an unlocked state when each of the at least one display elements are detected in their respective unlock position.

As noted previously, when in a locked state, at least a portion of the types of interactions that are generally allowed by the user interface are restricted. This can include all general access to the device with the exception of the actions which are interpreted in association with any perceived attempted unlocking of the device, or it can include access to one or more features or functions including access to one or more applications operating on the device. Access to these portions of the user interface will generally be restricted until the user interface is placed in an unlocked state, through the user executing a set of one or more actions relative to the device which triggers an unlocking of the user interface. In this way, unintended interactions which can trigger unintended consequences can be reduced.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A user interface for an electronic device comprising:
a touch sensitive display having a display surface, the touch sensitive display being adapted for presenting to a user at a respective position at least one display element along the display surface, and the touch sensitive display being further adapted for receiving from the user a user interaction with the touch sensitive display at a location along the display surface;
a controller including
a user interface state module having an unlocked state and a locked state adapted for selectively enabling and disabling at least a portion of the user interface, wherein the portion of the user interface responds to a predetermined type of user interaction when in the unlocked state and does not respond to the predetermined type of user interaction when in the locked state;
a state change module adapted for switching the state of the user interface state module between the locked state and the unlocked state, wherein the state change module switches the state of the user interface module from the locked state to the unlocked state when the state change module detects each of the at least one display elements in a respective unlock position of the corresponding one of the at least one display elements, the state change module including an unlock area detector, where the respective unlock position of the corresponding one of the at least one display element includes placement within a respective predetermined area, and wherein when the state change module switches the state of the user interface state module to a locked state, the state change module is adapted to respectively reposition each of the at least one display element to an area of the display surface other than the respective predetermined area of the respective unlock position; and
a lock state interface module, said lock state interface module being adapted to detect a received user interaction including the selection by the user of one of the at least one display elements, and being further adapted to detect a further received user interaction including a postselection gesture, which moves the selected one of the at least one display element from a preselection position to a postgesture position having a placement in a new area, wherein the postselection gesture includes a path which is traced proximate the display surface of the touch sensitive display by the user using a pointer having a position that moves along the path, the lock state interface module including a path analyzer unit having an avoid area detector, where if a current position of the pointer along the traced path coincides with an avoid area of the display surface, the display element is returned to the preselection position of the display element; and
wherein the at least one display element has a respective outer boundary, which extends around an outer periphery of the corresponding one of the at least one display element, wherein a sub-segment of the outer boundary is associated with a protection barrier, where the protection barrier extends around a portion of the outer boundary a distance, which is less than a full length of the outer boundary; and wherein interaction of the protection barrier and the avoid area causes the avoid area to recede proximate the protection barrier.

2. A user interface for an electronic device in accordance with claim 1, wherein the avoid area changes as a function of time.

3. A user interface for an electronic device in accordance with claim 2, wherein the avoid area has a size, where the size of the avoid area changes as a function of time.

4. A user interface for an electronic device in accordance with claim 2, wherein the avoid area has a location, where the location of the avoid area changes as a function of time.

5. A user interface for an electronic device in accordance with claim 1, wherein the avoid area has an associated visual representation, where the associated visual representation of the avoid area is a graphical representation of a hazard.

6. A user interface for an electronic device in accordance with claim 1, wherein the respective unlock position has an associated visual representation, and where the associated visual representation of the respective unlock position is a desired goal.

7. A user interface for an electronic device in accordance with claim 1, wherein the postgesture position includes a new orientation of the at least one display element, relative to the outer boundary, where the location of the protection barrier is changed to coincide with a different portion around the outer boundary than the portion of the outer boundary with which the protection barrier coincided as part of the preselection position.

8. A user interface for an electronic device in accordance with claim 1, wherein the path analyzer unit additionally has an upgrade area comparator where the protection barrier is initially activated, when the current position of the pointer along the traced path coincides with an upgrade area of the display surface.

9. A user interface for an electronic device in accordance with claim 1, wherein the locked state of the user interface state module disables the portion of the user interface, which is associated with controlling one or more predetermined applications being executed on the device.

10. A user interface for an electronic device in accordance with claim 1, wherein the locked state of the user interface state module disables the portion of the user interface associated with all user interactions other than those associated with changing the state of the user interface state module.

11. A method for managing a state of a user interface between a locked state and an unlocked state, the method comprising:
switching a state of the user interface from the unlocked state to the locked state;
presenting to the user via a display surface of a touch sensitive display at least one display element, each of the at least one display element being presented at a respective position, wherein when the state of the user interface is switched from the unlocked state to the locked state, the at least one display element is positioned in an area of the display surface other than a predetermined area of a respective unlock position;
detecting via the touch sensitive display a user interaction proximate the display surface, which comprises a selection by the user of one of the at least one display element and a postselection gesture, and which directs the movement of the display element from a preselection position to a postgesture position having a placement in a new area, where the postselection gesture includes a path which is traced proximate the display surface of the touch sensitive display by the user using a pointer having a position that moves along the path;

if a current position of the pointer along the traced path coincides with an avoid area of the display surface, the display element is returned to the preselection position of the display element;

if the current position of the pointer along the traced path does not coincide with the avoid area of the display surface, the display element is relocated at the postgesture position; and switching the state of the user interface from the locked state to the unlocked state, when each of the at least one display element is detected in the respective unlock position of the corresponding at least one display element.

12. A method for managing a state of a user interface in accordance with claim 11, wherein the postgesture position corresponds to an end of the traced path.

13. A method for managing a state of a user interface in accordance with claim 11, wherein the avoid area changes as a function of time.

14. A method for managing a state of a user interface in accordance with claim 13, wherein the avoid area has a size, where the size of the avoid area changes as a function of time.

15. A method for managing a state of a user interface in accordance with claim 13, wherein the avoid area has a location, where the location of the avoid area changes as a function of time.

16. A method for managing a state of a user interface in accordance with claim 11, wherein the at least one display element has a respective outer boundary, which extends around an outer periphery of the corresponding one of the at least one display element, wherein a sub-segment of the outer boundary is associated with a protection barrier, where the protection barrier extends around a portion of the outer boundary a distance, which is less than a full length of the outer boundary; and wherein interaction of the protection barrier and the avoid area causes the avoid area to recede proximate the protection barrier.

17. A method for managing a state of a user interface in accordance with claim 16, wherein the postgesture position includes a new orientation of the at least one display element, relative to the outer boundary, where the location of the protection barrier is changed to coincide with a different portion around the outer boundary than the portion of the outer boundary with which the protection barrier coincided as part of the preselection position.

18. A method for managing a state of a user interface in accordance with claim 16, wherein the protection barrier is initially activated, when the current position of the pointer along the traced path coincides with an upgrade area of the display surface.

* * * * *